United States Patent [19]

Walker

[11] Patent Number: 4,942,287
[45] Date of Patent: Jul. 17, 1990

[54] LINOLEUM ROLL HEATER ASSEMBLY
[76] Inventor: Paul Walker, 233 W. Cirton, Corona, Calif. 91720
[21] Appl. No.: 367,885
[22] Filed: Jun. 19, 1989
[51] Int. Cl.$^5$ .............................................. H05B 3/58
[52] U.S. Cl. .................................. 219/385; 219/521; 219/535
[58] Field of Search ............... 219/385, 386, 521, 469, 219/470, 471, 390, 535, 214, 528, 244; 34/104; 432/183, 224, 225

[56] References Cited

U.S. PATENT DOCUMENTS

| | | | |
|---|---|---|---|
| 1,442,419 | 1/1923 | Ashworth | 34/104 |
| 2,351,482 | 6/1944 | Campbell | 34/104 |
| 2,613,480 | 10/1952 | Mongan | 34/104 |
| 3,217,137 | 11/1965 | Weitzner | 219/470 |
| 3,374,338 | 3/1968 | Morey | 219/535 |
| 4,616,474 | 10/1986 | Morley | 219/469 |

Primary Examiner—Teresa J. Walberg
Attorney, Agent, or Firm—Morland C. Fischer

[57] ABSTRACT

A linoleum roll heater assembly for heating a roll of linoleum while in storage or at a job site located at a cold weather environment. The heater assembly includes a heater tube to be received through the roll of linoleum to be heated. The heater tube is supported for rotation between a pair of side support blocks to facilitate unrolling and dispensing the heated linoleum. An insulating and heating cover or blanket is removably wrapped around the linoleum roll to prevent the escape of heat. The linoleum roll is uniformly heated by respective heating elements of the heater tube and the heating blanket, whereby linoleum may be continuously disposed from its roll with the expenditure of a minimal pulling force.

13 Claims, 4 Drawing Sheets

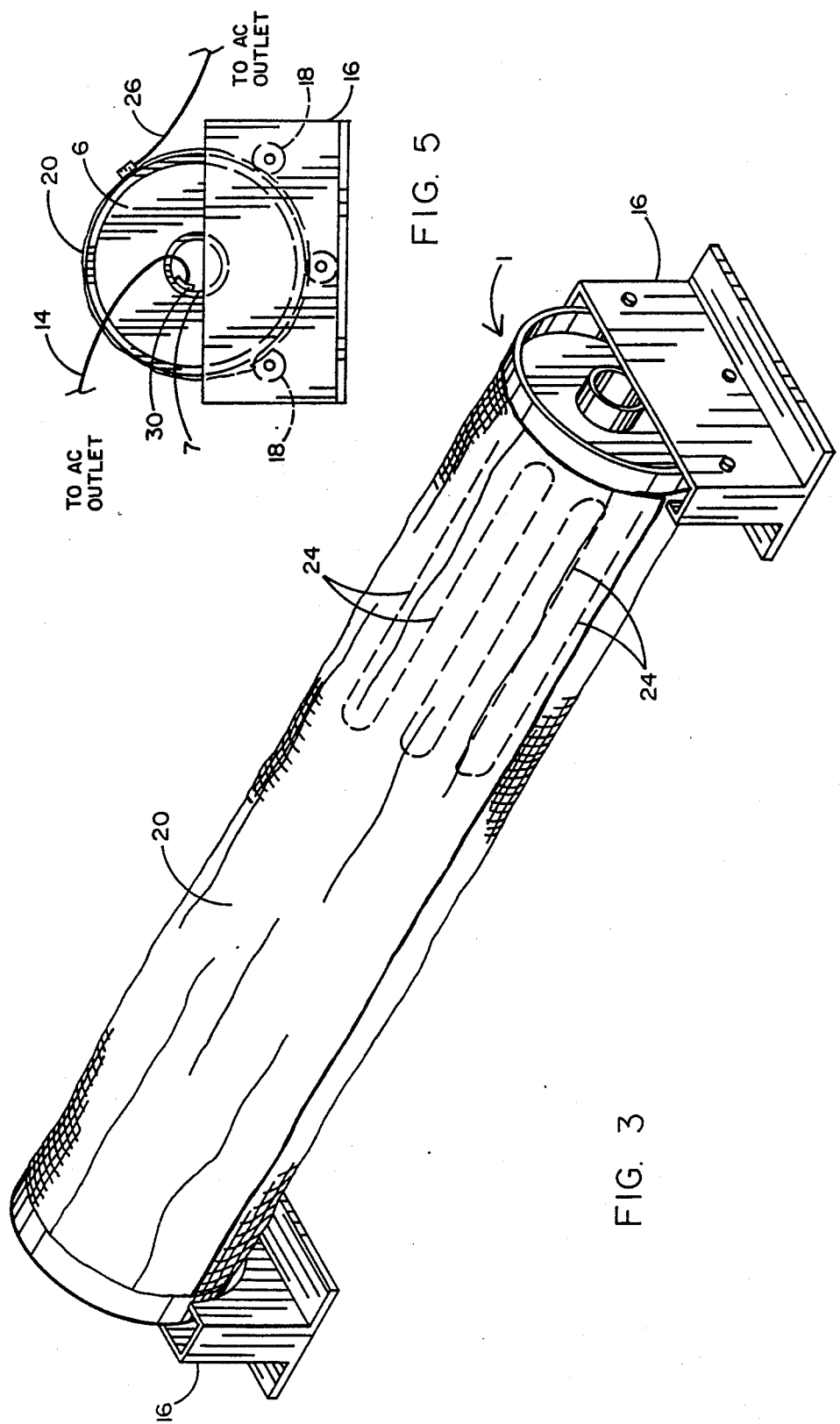

LINOLEUM ROLL HEATER ASSEMBLY

BACKGROUND OF THE INVENTION

1. Field of the Invention

This invention relates to a heater assembly by which to quickly and efficiently heat a roll of linoleum in storage or at a job site characterized by cold weather so that linoleum may be easily and continuously dispensed from its roll.

2. Background Art

As will be known to linoleum installers, it may be both difficult and time consuming to dispense and/or install hard surface linoleum from a linoleum roll when the job site is located within a cold weather environment. That is, a low temperature typically causes the linoleum to be inflexible, brittle, and, therefore, hard to unroll and subject to cracking. One commonly practiced technique for heating a linoleum roll at a job site, so as to be better able to dispense the linoleum therefrom, involves utilizing large space heaters. However, this technique is expensive, inefficient and dangerous, since space heaters require an open flame to heat the roll. Another technique is to lay the linoleum roll in the sun so that the daylight heat will eventually raise the temperature of the linoleum. However, this technique is very slow, and, in many cases, is unreliable, particularly when the sun is shielded by a cloud cover.

Examples of conventional heating assemblies are available to referring to one or more of the following U.S. Pat. Nos.:

2,831,096: Apr. 15, 1958
3,644,708: Feb. 22, 1972
4,131,269: Dec. 26, 1978

U.S. While Pat. Nos. 2,831,096 and 3,644,708 describe apparatus for heating vinyl sheets and tiles, none of the disclosed apparatus is at all suitable for heating a roll of linoleum, or the like. Therefore, it would be desirable to have available at a job site or storage facility a heater to quickly, reliably and uniformly heat a roll of linoleum so that linoleum can be continuously and easily dispensed therefrom with the expenditure of a minimal pulling force and without subjecting the linoleum to cracking.

SUMMARY OF THE INVENTION

In general terms, a heater assembly is disclosed to quickly and uniformly heat a roll of linoleum at a job site and/or storage facility characterized by cold weather, so that linoleum can be continuously and easily dispensed from the roll with the expenditure of a minimal pulling force. The heater assembly includes a heater tube having a thermostatically controlled heating element extending therealong to heat the linoleum roll from the inside-out and a pair of end caps attached to opposite ends of the heater tube. At least one end cap is removable from the heater tube to permit the tube to be inserted through the interior of a roll of linoleum to be heated. The end caps are received within respective side support blocks. Each support block has a set of rollers over which the end caps of the heater assembly rotate to facilitate dispensing the linoleum from its roll. A heating cover or blanket is releasably wrapped around the linoleum roll to prevent the escape of heat therefrom. The heating blanket includes a heating element to heat the linoleum roll from the outside-in.

In operation, the respective heating elements of the heater tube and heating blanket are electrically powered to cause the roll of linoleum to be uniformly heated to a temperature (e.g. 70 degrees F) at which the linoleum can be easily dispensed. Once the roll of linoleum is heated, the heating blanket is unwrapped therefrom and removed. Accordingly, any length of linoleum may be dispensed from and cut off the roll. When the roll has been fully dispensed, the removable end cap is detached from the heater tube so that the spent linoleum roll can be removed and replaced with a fresh roll to be heated. The end cap and heating blanket are then reattached to the heating assembly so that the new roll can also be quickly and uniformly heated.

BRIEF DESCRIPTION OF THE DRAWINGS

FIG. 3 is a perspective view of the heater assembly;

FIG. 5 is an end view of the heater assembly of FIG. 4; and

DESCRIPTION OF THE PREFERRED EMBODIMENT

Figure 1:
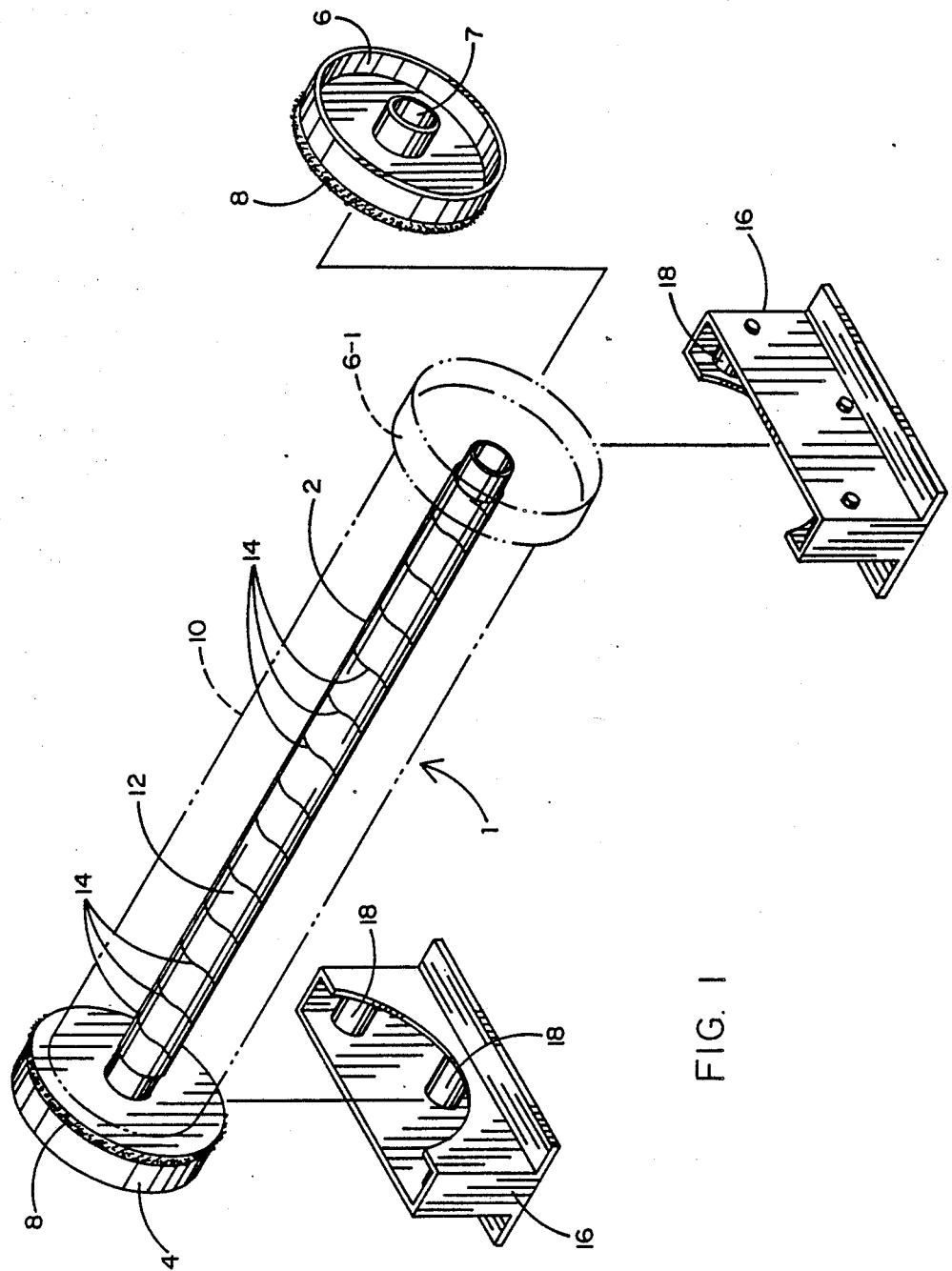
FIG. 1 is an exploded view of the linoleum roll heater assembly which forms the present invention.

The heater assembly of the present invention is best described while referring to the drawings, where FIG. 1 shows an exploded view thereof. More particularly, the assembly includes a linoleum roll heater 1 having a cylindrical heater tube 2 and a pair of cylindrical end caps 4 and 6 which are located at opposite ends of heater tube 2. One of the end caps 4 is fixedly attached (e.g. welded) to an end of the heater tube 2, while the other end cap 6 has a hollow sleeve 7 extending therethrough by which end cap 6 can be detachably connected (e.g. by means of complementary screw threads, fasteners, or the like, to the opposite end of tube 2 (shown in phantom and indicated by the reference numeral 6-1). Accordingly, end cap 6 may be removed from heater tube 2 when it is desirable to fit the tube through a linoleum roll (shown in phantom and indicated by the reference numeral 10) to be heated. Each end cap 4 and 6 has a strip 8 of hook and loop fastening material (commonly known as Velcro) extending around the periphery thereof. The purpose of fastening strips 8 will be described in greater detail when referring hereinafter to FIG. 2.

The heater tube 2 is surrounded with a rubber liner 12. Embedded within or under the liner 12 is a resistive (e.g. four) conductor heating element 14 that is spirally wound along heater tube 2. Heating element 14 generates heat to be transferred from the inside to the outside of the linoleum roll 10 so as to raise the temperature of the linoleum and, thereby, facilitate a smooth and continuous dispensing thereof.

The heater 1 is provided with a pair of hollow side support blocks 16. Each side support block 16 is sized to receive therewithin a respective cylindrical end cap 4 or 6 of heater tube 2. One face of each side support block 16 is open to accommodate the linoleum roll 10 therethrough. The side support blocks 16 retain the linoleum roll 10 in a spaced relationship with the ground so as to permit the linoleum to be evenly heated and easily dispensed from its roll. To this end, each side support 16 is provided with a plurality of (e.g. three) rollers 18 upon which an end cap 4 or 6 of heater tube 2 is to be received. Each roller 18 is mounted for rotation between opposite faces of its support block 16 so as to permit the linoleum roll 10 to be rotated thereover when it is desirable to dispense the linoleum (best illustrated in FIG. 6).

Figure 4:
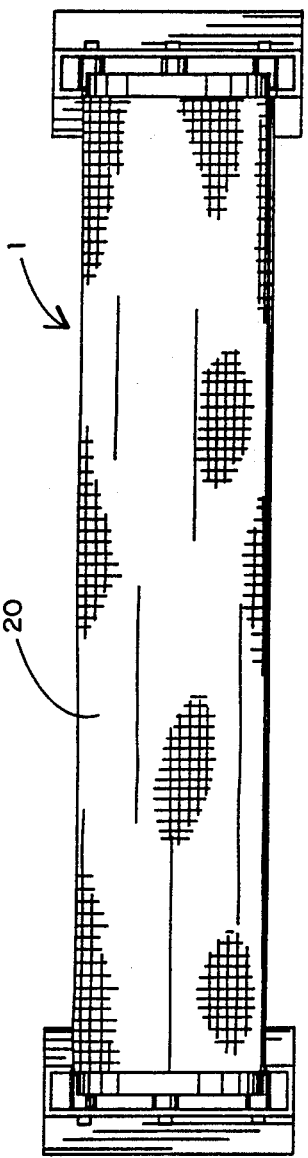
FIG. 4 is a top view of the heater assembly of the present invention in the assembled configuration.
Figure 2:
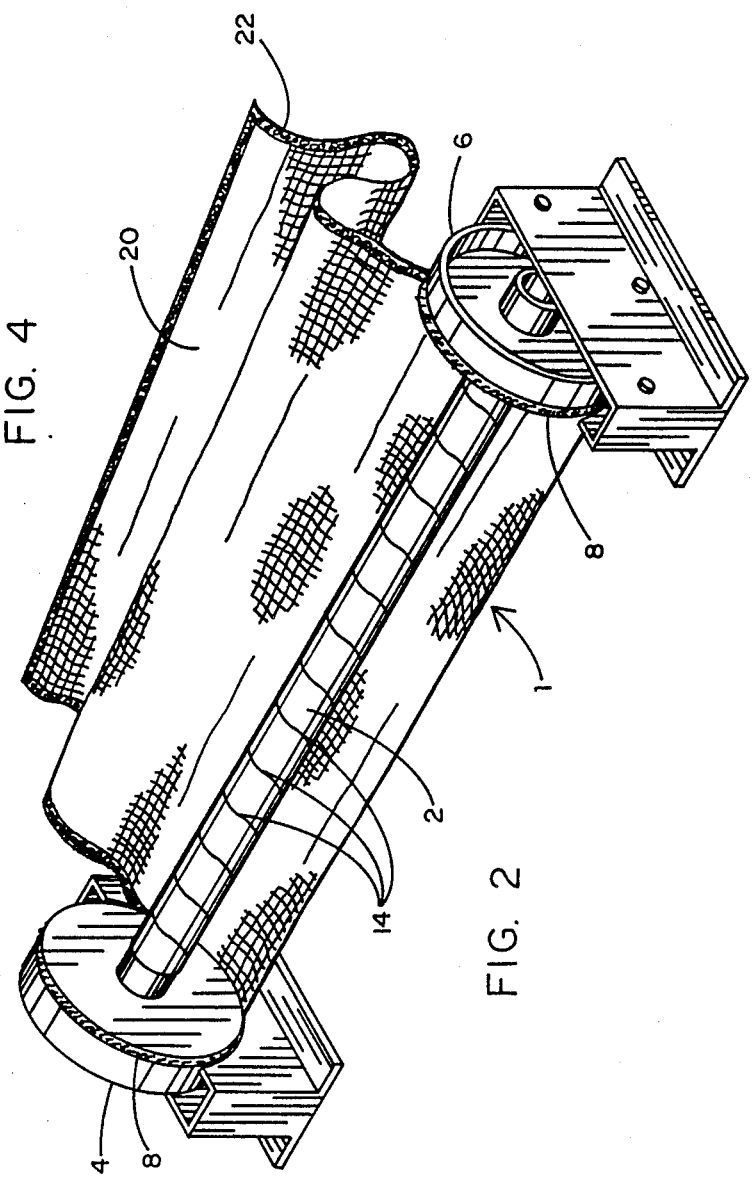
FIG. 2 shows the heater assembly of FIG. 1 with the addition of a heating cover or blanket to be removably attached thereto.

Referring now to FIG. 2 of the drawings, the linoleum heater 1 of FIG. 1 is shown with the addition of a heating cover or blanket 20. Heating blanket 20 is sized so as to be wrapped around the linoleum roll (designated 10 in FIG. 1). The heating blanket 20 is provided with a continuous border of hook and loop (i.e. Velcro) fastening material 22 which extends around the front and rear of faces thereof. In the assembled relationship of FIGS. 3-5, with blanket 20 wrapped completely around the roll of linoleum, the fastening material 22 along the sides of blanket 20 is moved into mating engagement with the complementary strip 8 of fastening material that extends around the end caps 4 and 6 of heater tube 2. Moreover, the fastening material 22 along the top front face of blanket 20 is moved into mating engagement with complementary material at the bottom rear face of blanket 20. In this fashion, the heating blanket may be releasably attached to the heater 1 so as to surround the linoleum roll (best illustrated in FIGS. 3 and 4).

Heating blanket 20 includes a heating element (designated 24 in FIG. 4) extending therethrough. The heating element 24 generates heat to be transferred from the outside to the inside of the linoleum roll to raise the temperature thereof. The blanket 20 is manufactured from a suitable insulating material (e.g. canvas or the like) to prevent the escape of heat. Accordingly, the combination of the heating element 14 of heater tube 2 and the heating element 24 of heating blanket 20 function to uniformly heat the linoleum roll to a sufficient temperature (e.g. 70 degrees F) at which to permit the linoleum to be easily dispensed within relatively cold environments.

As is best shown in FIG. 5, one end of an electrical cord 26 is interconnected with the heating element 24 of blanket 20, while the opposite end of cord 26 is adapted for receipt at an AC outlet so that power can be provided to said heating element. Moreover, the heating element 14 of heater tube 2 is received through the hollow sleeve 7 of end cap 6 to be connected to an AC (or optional DC) outlet so that power can also be provided to said heating element. It may be desirable to interconnect heating element 14 with a thermostat 30 so that the heat generated at heater tube 2 can be selectively regulated. In this case, the thermostat 30 may be disposed within and protected by the sleeve 7 of end cap 6 so as to be easily accessible to the operator.

Figure 6:
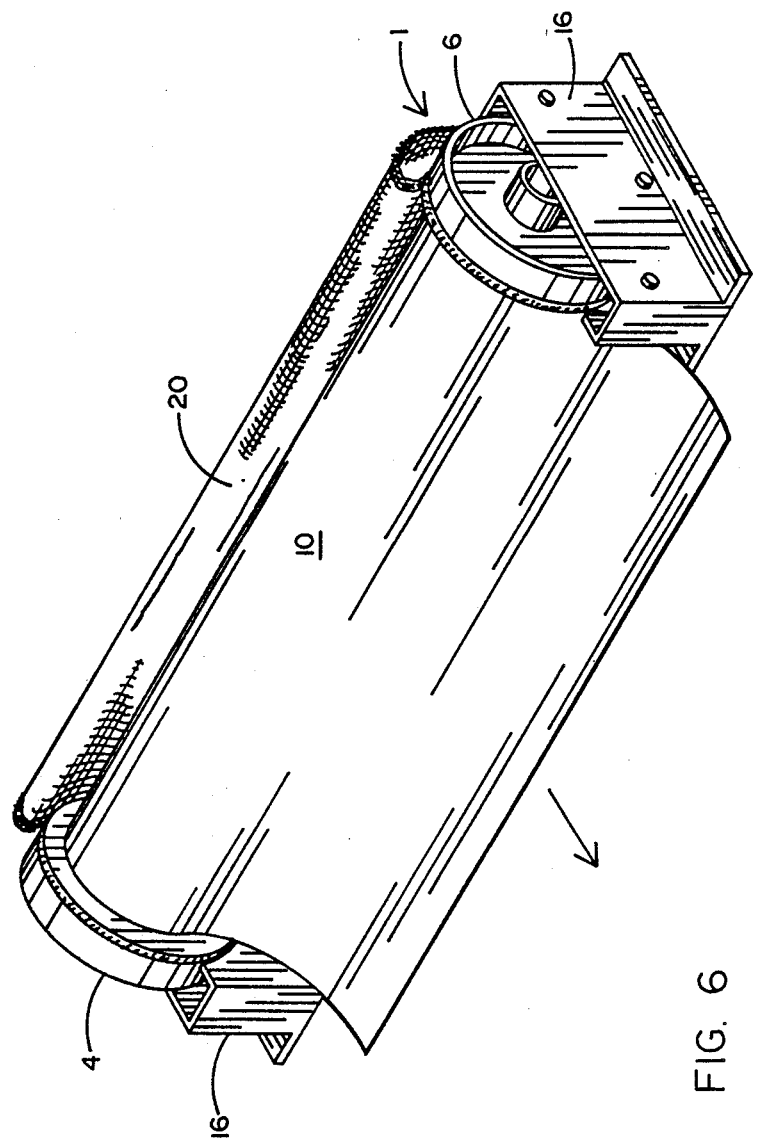
FIG. 6 shows the heater assembly with the heating blanket removed and a sheet of linoleum being dispensed therefrom.

FIG. 6 of the drawings shows linoleum being dispensed after the linoleum roll 10 has been heated to a suitable temperature. More particularly, the heating blanket 20 is unwrapped from the heater 1 and detached from the end caps 4 and 6. The leading edge of the heated linoleum is pulled outwardly from the roll 10 (in the direction of the reference arrow). When the linoleum is pulled, the linoleum roll 10 is caused to rotate. That is, and referring concurrently to FIGS. 1 and 6, the rotary motion of linoleum roll 10 is transferred to the end caps 4 and 6 of heater tube 2, whereupon said end caps rotate over the rolls 18 of side support blocks 16. The ability of rollers 18 to also rotate permits the linoleum to be dispensed without interruption and with the expenditure of a minimal pulling force.

Any length of linoleum may be pulled from and cut off roll 10 for installation at a job site. If necessary, the roll may be rewrapped by blanket 20 and reheated to the desired temperature to facilitate dispensing of the linoleum at a later time. Alternatively, the blanket 20 may be merely rewrapped around the roll 10 so as to maintain the elevated temperature thereof within the cooler surrounding environment so that different lengths of linoleum may be successively pulled out and cut off at different times.

Once the linoleum has been fully dispensed, the linoleum roll heater is lifted out of its side support blocks 16, and the detachable end cap 6 is removed from the heater tube 2. The core of a spent linoleum roll (around which the linoleum is wrapped) is then removed from the heater tube, and a new linoleum roll is substituted therefor. The heater 1 is then reassembled to permit the new linoleum roll to be quickly and efficiently heated, in the manner previously disclosed, while avoiding the shortcomings that are inherent with techniques that have been used in the past for heating a linoleum roll at a job site located within a cold environment.

It will be apparent that while a preferred embodiment of the invention has been shown and described, various modifications and changes may be made without departing from the true spirit and scope of the invention. For example, while the heater assembly of the present invention has been described as having particular application to heating a roll of linoleum, it is to be expressly understood that rolls of material, other than linoleum, may also be quickly and reliably heated.

Having thus set forth a preferred embodiment of the invention, what is claimed is:

1. A heater assembly for heating a roll of material having a hollow core, said heater assembly comprising:
   a heating tube to be inserted through the core of the roll of material;
   an electrical heating element extending along said heating tube and adapted to be powered from an electrical source to provide heat to the roll of material;
   cover means to surround the roll of material and prevent the loss of heat therefrom;
   first and second end caps attached to opposite ends of said heating tube to retain the roll of material therebetween, at least one of said end caps being detachable from said heating tube to permit said heating tube to be inserted through the core of the roll of material; and
   means by which to removably attach said cover means to said first and second end caps when said cover means surrounds the roll of material.

2. The heater assembly recited in claim 1, wherein said attachment means includes a strip of hook and loop fastening material located around the periphery of each of said first and second end caps and complementary strips of hook and loop fastener material extending along the sides of said cover means, said complementary strips of fastener material being moved into mating engagement with one another when said cover means is positioned to surround the roll of material.

3. The heater assembly recited in claim 1, wherein said cover means includes an electrical heating element that is adapted to be powered from an electrical source to provide heat to the roll of material.

4. The heater assembly recited in claim 1, further comprising temperature control means interconnected with the electrical heating element of said heating tube to control the temperature to which the roll of material is heated by said heating element.

5. The heater assembly recited in claim 1, further comprising first and second support means located at opposite ends of said heating tube for receiving respective ones of said first and second end caps and thereby positioning said heating tube and the roll of material above the ground.

6. The heater assembly recited in claim 5, wherein each of said first and second support means has at least one roller surface over which said end caps are rotated when material is dispensed from the roll of material and said roll is rotated as a result thereof.

7. A heater assembly for heating a roll of material having a hollow core, said heater assembly comprising:
   first heating means to be inserted through the hollow core of the roll of material to provide heat to the roll from the interior thereof;
   cover means to surround the roll of material and prevent the loss of heat therefrom; and
   second heating means located within said cover means to provide heat to the roll of material from the exterior thereof.

8. The heater assembly recited in claim 7, wherein said first heating means includes a heating tube inserted through the core of the roll of material and a heating element carried by said tube and powered from an electrical source to provide heat to the roll of material at the core thereof.

9. The heater assembly recited in claim 8, wherein said heating tube has first and second end caps attached to opposite ends of said tube to retain the roll of material therebetween, at least one of said end caps being detachable from said heating tube to permit said tube to be inserted through the core of the roll of material.

10. The heater assembly recited in claim 9, further comprising first and second support means located at opposite ends of said heating tube for receiving respective ones of said first and second end caps to space the roll of material through which said heating tube extends above the ground.

11. The heater assembly recited in claim 10, wherein each of said first and second support means has at least one roller surface over which said end caps are rotated when material is dispensed from the roll of material and said roll is rotated as a result thereof.

12. The heater assembly recited in claim 7, wherein said second heating means includes an electrical heating element that extends through said cover means and is powered from an electrical source to provide heat to said roll at the exterior thereof.

13. The heater assembly recited in claim 7, further comprising fastening means by which to removably attach said cover in surrounding engagement with the roll of material.

* * * * *